US011212684B2

(12) United States Patent
Hadley (10) Patent No.: US 11,212,684 B2
(45) Date of Patent: Dec. 28, 2021

(54) SYSTEMS AND METHODS FOR THE VISUAL REPRESENTATION AND SIMULATION OF ELECTROMAGNETIC RADIATION DISTRIBUTION IN A VOLUME OF SPACE

(71) Applicant: Ryan Robert Hadley, The Colony, TX (US)

(72) Inventor: Ryan Robert Hadley, The Colony, TX (US)

( * ) Notice: Subject to any disclaimer, the term of this patent is extended or adjusted under 35 U.S.C. 154(b) by 0 days.

(21) Appl. No.: 16/321,442

(22) PCT Filed: Jul. 27, 2017

(86) PCT No.: PCT/US2017/044211
§ 371 (c)(1),
(2) Date: Jan. 28, 2019

(87) PCT Pub. No.: WO2018/022909
PCT Pub. Date: Feb. 1, 2018

(65) Prior Publication Data
US 2020/0068413 A1    Feb. 27, 2020

Related U.S. Application Data

(60) Provisional application No. 62/367,524, filed on Jul. 27, 2016.

(51) Int. Cl.
*H04W 16/20* (2009.01)
*H04B 17/391* (2015.01)
(Continued)

(52) U.S. Cl.
CPC ............. *H04W 16/20* (2013.01); *G06T 11/00* (2013.01); *H04B 17/3912* (2015.01); *H04W 84/12* (2013.01)

(58) Field of Classification Search
None
See application file for complete search history.

(56) References Cited

U.S. PATENT DOCUMENTS 8,229,469 B2   7/2012  Zhang et al.
9,307,368 B1   4/2016  Bartlett
(Continued)

FOREIGN PATENT DOCUMENTS

WO    2012038779 A1   3/2012
WO    2014152467 A1   9/2014
WO    2016003862 A1   1/2016

OTHER PUBLICATIONS

PCT International Search Report and Written Opinion in PCT Application Serial No. PCT/US2017/044211 dated Oct. 10, 2017.

*Primary Examiner* — Jennifer Mehmood
*Assistant Examiner* — Jed-Justin Imperial
(74) *Attorney, Agent, or Firm* — Alliance IP, LLC (57) ABSTRACT

Aspects of the embodiments are directed to systems, methods, and computer program products for displaying floorplans and electromagnetic (EM) emissions to facilitate EM emission design within the floorplan. The display of the floorplan and EM emissions can be performed on a wearable device, such as a augmented reality implement or virtual reality implement. The implement can also facilitate a configuration, manipulation, and revision of floorplan and EM emitter positioning, to allow an operator to more precisely configure EM emitter placement and selection.

17 Claims, 9 Drawing Sheets

(51) Int. Cl.
   *G06T 11/00*    (2006.01)
   *H04W 84/12*    (2009.01)

(56) References Cited

U.S. PATENT DOCUMENTS

| | | | |
|---|---|---|---|
| 9,326,103 B2 | 4/2016 | Shen et al. | |
| 2004/0143428 A1* | 7/2004 | Rappaport | H04L 41/12 703/22 |
| 2005/0201826 A1* | 9/2005 | Zhang | G06Q 30/02 404/2 |
| 2009/0144143 A1 | 6/2009 | Iyer | |
| 2011/0178668 A1* | 7/2011 | Tanaka | G09B 29/106 701/25 |
| 2015/0018018 A1* | 1/2015 | Shen | G01C 21/08 455/457 |
| 2015/0031300 A1 | 1/2015 | Holman et al. | |
| 2016/0037385 A1 | 2/2016 | Boudreau et al. | |
| 2016/0078259 A1 | 3/2016 | Mutiloa | |
| 2016/0100320 A1* | 4/2016 | Dayanandan | H04W 16/18 455/446 |
| 2016/0322817 A1* | 11/2016 | Baker | G05B 15/02 |
| 2017/0184846 A1* | 6/2017 | Lu | G02B 27/017 |
| 2018/0144555 A1* | 5/2018 | Ford | G06T 15/04 |

* cited by examiner

SYSTEMS AND METHODS FOR THE VISUAL REPRESENTATION AND SIMULATION OF ELECTROMAGNETIC RADIATION DISTRIBUTION IN A VOLUME OF SPACE

CROSS REFERENCE TO RELATED APPLICATION

This Application is a national phase application under 35 U.S.C. § 371 of PCT International Application Serial No. PCT/US2017/044211 filed on Jul. 27, 2017 and entitled SYSTEMS AND METHODS FOR THE VISUAL REPRESENTATION AND SIMULATION OF ELECTROMAGNETIC RADIATION DISTRIBUTION IN A VOLUME OF SPACE, which application claims the benefit of priority to U.S. Provisional Patent Application Ser. No. 62/367,524, filed on Jul. 27, 2016. The disclosures of the prior applications are considered part of and are hereby incorporated by reference in their entirety in the disclosure of this application.

TECHNICAL FIELD

This disclosure pertains, but is not limited, to the field of wireless networking (Wi-Fi).

BACKGROUND

Managing every aspect of Wi-Fi design can include several steps, such as obtaining the most accurate floorplans, factoring in building materials, user densities, points of attenuation, utilizing Location Based Services, Main Distribution Frame (MDF)/Intermediate Distribution Frame (IDF) locations, hardware procurement, installation, and post-install troubleshooting, not to mention keeping the client interested and focused, the task of selling, designing, implementing, and troubleshooting a Wi-Fi network can take weeks. The Wi-Fi design process can lead to long engagement times which can impact the bottom-line of everyone involved.

SUMMARY

Accuracy of designs, streamlined procurement processes, centralized project management, and simplification of efforts are factors in improving quality of service. This carries over to the client in the form of a solid foundation which the client can utilize for their data-heavy networks.

The disclosure pertains, but is not limited, to a way to visually represent and simulate the distribution of Electromagnetic Radiation (EMR). It also emphasizes the ability to virtually navigate and manipulate the augmented reality environment representing such an EMR distribution.

This disclosure describes the ability to generate a virtual or augmented reality in which the simulated distribution of EMR will be viewable in a real-world environment, either through a Virtual Reality (VR) environment, or a camera overlay through Augmented Reality (AR). The systems and methods described herein seek to allow anyone to view EMR with either a Virtual Reality Implement, or an Augmented Reality implement, for example, a mobile device with a camera. It also describes the ability of the Virtual Reality implement and Augmented Reality implement to communicate with a centralized, web-based, database for synchronization of information.

DETAILED DESCRIPTION

Figure 1:
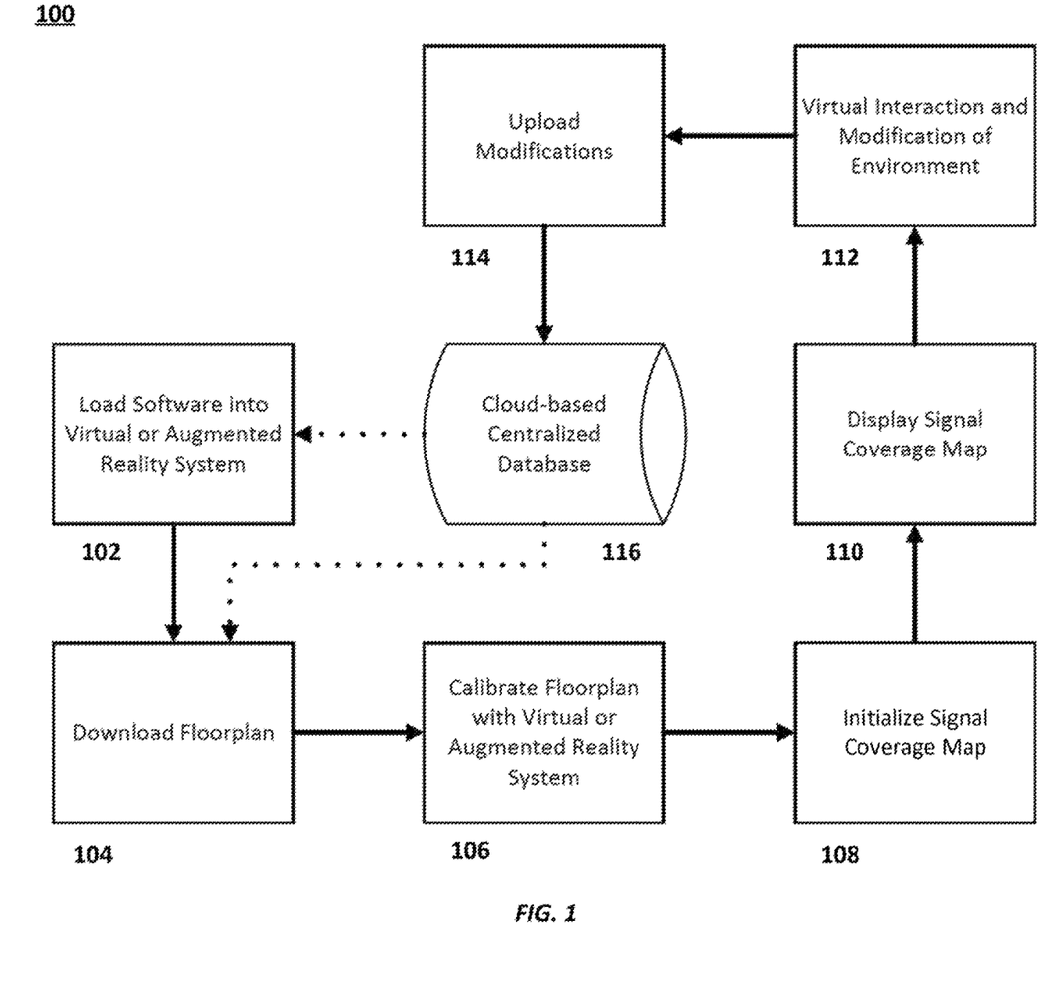
FIG. 1 is a process flow diagram for operating a visualization implement for visualizing and interacting with a virtual electromagnetic emitter design in accordance with an implementation.

FIG. 1 is a diagram illustrating an overall process 100 a user will go through when using the method, in accordance with an implementation.

The end-user is expected to be able to run software on their AR or VR implement that will serve as the platform to interface with predictive Wi-Fi design applications, or at least allow the end-user to access a database of floorplans that have Wi-Fi design parameters implemented, and EM emitters placed (102). An example Wi-Fi design application is described in U.S. patent application Ser. No. 15/480,278, filed on Apr. 5, 2017, the entire contents of which are hereby incorporated by reference.

Once the software has been loaded on the end-user's AR or VR implement of choice, the end-user can download a floorplan from a local or cloud-based repository to be used by the software running on the AR or VR implement that handles these designs (104).

Once downloaded, the end-user can calibrate the floorplan that is to be used by the end-user, to match their currently engaged AR or VR implement, with the environment that the end-user currently inhabits (106). Part of the calibration can include defining a currently inhabited space as it relates to the floorplan to serve as a calibration point for the AR or VR implement's software to determine the end-user's physical location (106).

The end user can then initialize a signal coverage map (108). When the end-user has selected the desired floorplan to use with their chosen AR or VR implement, the end-user must define the characteristics of the signal coverage map to be projected. Here, the end-user can create their desired experience of the design to match their technical parameters, but will also be bound by the technical limitations of the AR or VR implement which the end-user has chosen.

After the end-user has defined the parameters from within the software of the AR or VR implement, and the end-user has calibrated the floorplan that is to be projected, the AR or VR implement will then be able to project the calibrated and initialized signal coverage map onto and within the chosen AR or VR implement by the end-user 110. The projected signal coverage map is now visible to the end-user, and the end-user is now able to see the information and parameters contained within the design of the uploaded floorplan in real-time.

The end-user is also able to interact with elements that are present within the simulation, and the end-user is now able to add, remove, or modify virtual elements, limited to the capabilities of the software running on the chosen AR or VR implement of the end-user (112).

Elements that are added, removed, or modified during the time of use by the end-user can be automatically uploaded to a centralized database or local repository. The end-user can elect to have the updates to a design pushed to the centralized database or local repository manually or automatically (114).

A cloud-based centralized database can serve as a localized point for collaborative efforts, and can be accessed by multiple party members (116). This will serve as a consolidated store for uploaded designs and can contain the files used by the AR or VR implement chosen by the end-user, which may be referenced when attempting to perform the previous steps. A cloud-based centralized database can allow an end-user to maintain relevant and consistent project data across any capable hardware platform. This can ensure that the same plan and updates will be consistent regardless of the chosen AR or VR implement by the end-user, limited by the capabilities of the chosen AR or VR implement.

Embodiments of the disclosure include hardware and software systems, such as AR and/or VR systems that provide an interface for visualizing and interacting, virtually, with a Wi-Fi design.

The user can load software running on the virtual reality implement or augmented reality implement, connecting them (or not) to a centralized database containing a signal coverage map with EMR distribution data. The user then selects their signal coverage map that they wish to interact with and loads the plan into their selected virtual reality implement or augmented reality implement. The user then calibrates their 3D position on the signal coverage map. The selected virtual reality implement or augmented reality implement will then prompt the user to load the signal coverage map and EMR distribution data. Once loaded, the signal coverage map will become visible to the user through their virtual reality implement or augmented reality implement. The user can then be able to manipulate the position of virtual EMR emitters with hand gestures. The user can then move, add, change, or delete the virtual EMR emitters.

The user may also be able to pull data from individual virtual EMR emitters, when they have real world counterparts. The user can move, add, change, or delete cabling data going to each of the virtual EMR emitters. The user can also move, add, change, or delete environmental element characteristics.

After each change is made, the changes are synchronized to a centralized, cloud-based database. In addition to the direct user experience, the virtual experience can be streamed to a web-based portal allowing multiple parties to view what the user is viewing, simultaneously.

Active synchronization will take place between the Emitter Controller, the Cloud-based Database, and the Virtual Reality or Augmented Reality implement, which consists of data regarding, but not limited to, emitter transmit (Tx) and receive (Rx) power, user capacity, active connections to the emitters, the type of spectrum, country and/or industry specific regulations (e.g., IEEE standard 802.11a/b/g/n/ac), the make and model of the emitters and their controller, and network information related to communication between the devices involved.

Figure 2:
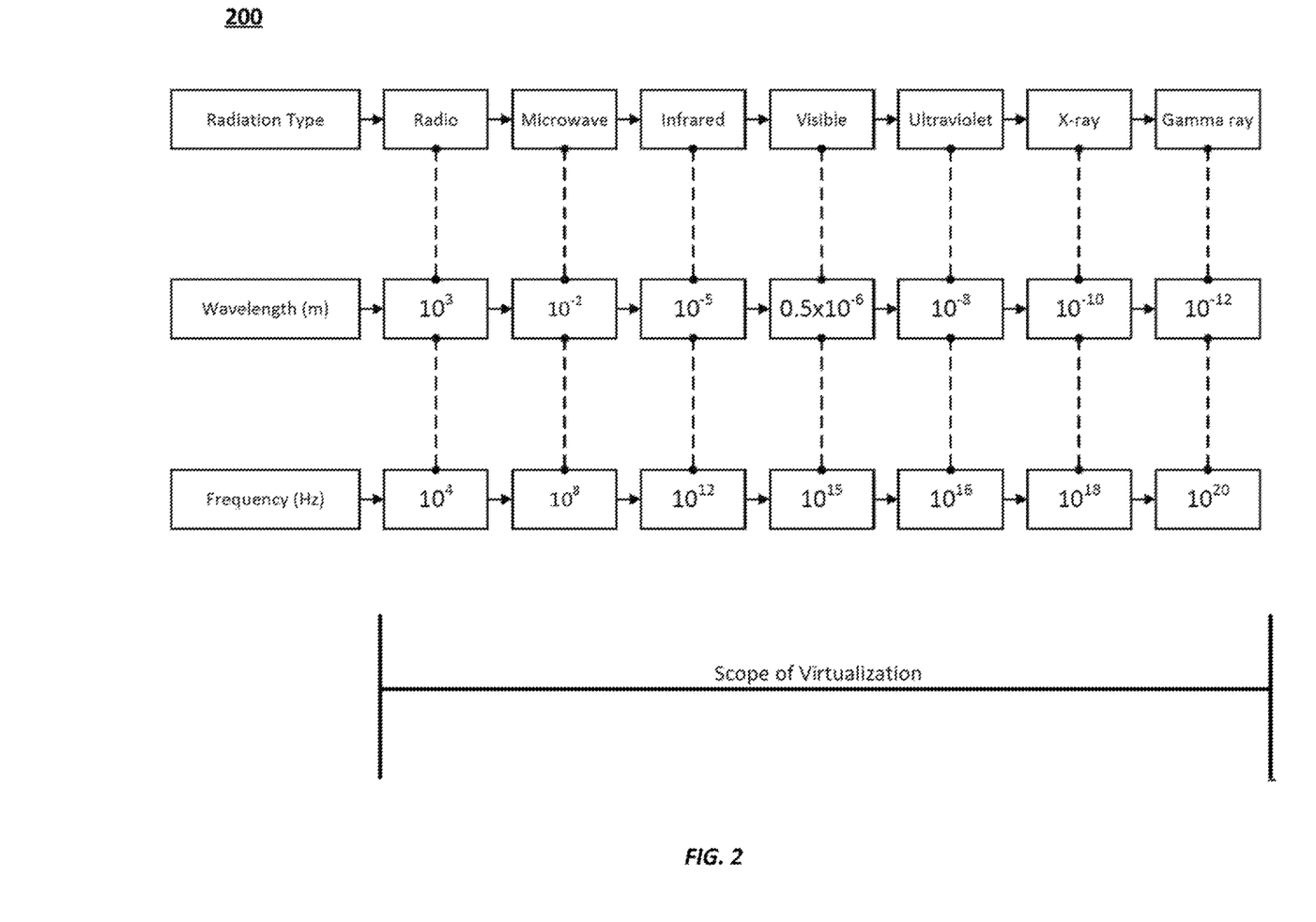
FIG. 2 is a diagram illustrating the entire electromagnetic spectrum and what the method will be able to virtualize and simulate, in accordance with an implementation.

FIG. 2 is a diagram illustrating the entire electromagnetic spectrum (200) and what the method may be able to virtualize and simulate, in accordance with an implementation. Definition of Electromagnetic Spectrum: "The entire range of wavelengths or frequencies of electromagnetic radiation extending from gamma rays to the longest radio waves and including visible light." This disclosure does not claim the Electromagnetic Spectrum itself, but the ability in which an AR or VR implement may be leveraged to interpret, via simulation, what emitters produce and make it visually available to the end-user, limited to the capabilities of any chosen AR or VR implement.

Figure 3A:
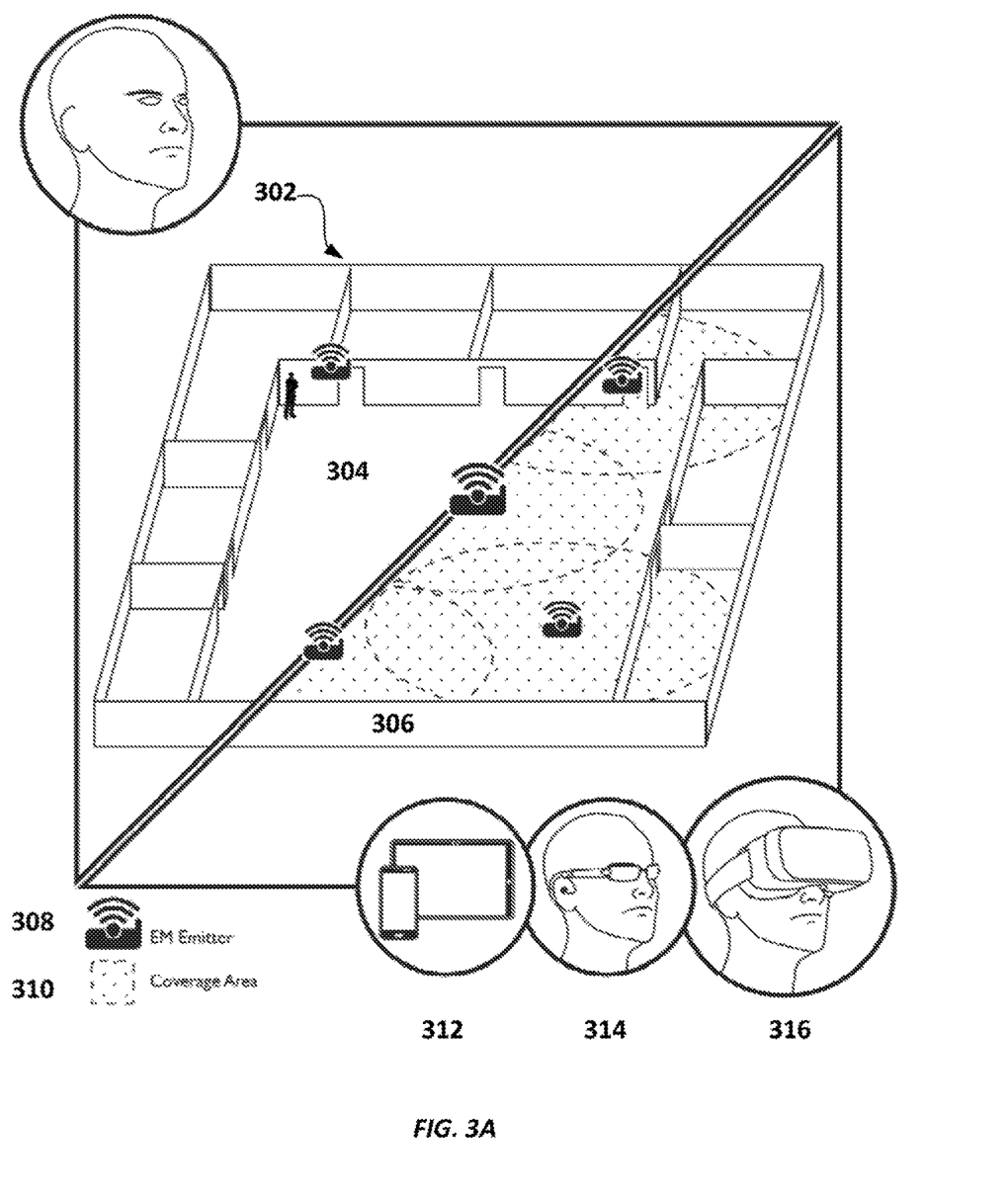
FIG. 3A is a conceptualized rendering of an isometric view of simulated EMR in an environment, in accordance with an implementation.

FIG. 3A is a conceptualized rendering of an isometric view 300 of simulated EMR in an environment, in accordance with an implementation. An end-user can be described as an individual who is capable of operating and interacting with either an AR or VR implement, or both. The isometric view 300 includes a schematic view of a floorplan 302. The floorplan portion 304 is a visualization of the floorplan shown without the visualization of the emitter signals. An end-user can be physically located on the floor of any environment as it pertains to the chosen floorplan that the end-user has elected to initialize. The floorplan 302 should indicate obstacles that may be encountered in an environment, such as but not limited to, walls, columns, ceilings, furniture, and other related obstacles with any known or unknown material composition.

The floorplan 302 can be shown with emitter signals, such as floorplan portion 306. The coverage area can be visualized by several visual cues: for example, as shown in FIG. 3A, the coverage area can be shown using lines and dots 310. The emitter signals can emanate from fixed positions representative of EM emitters 308. The potential capabilities of a given emitter selected by the end-user as related to this disclosure include, but are not limited to, capacity, range, power, and the nature of the emission by an EM emitter.

The floorplan 302 and coverage areas can be displayed using different types of devices. For example, an end-user can use a tablet or mobile phone AR implement 312, or a wearable AR implement 314, or a wearable VR implement 316, to view the projection of EM signal. Other implements can also be used and are within the scope of this disclosure.

Figure 3B:
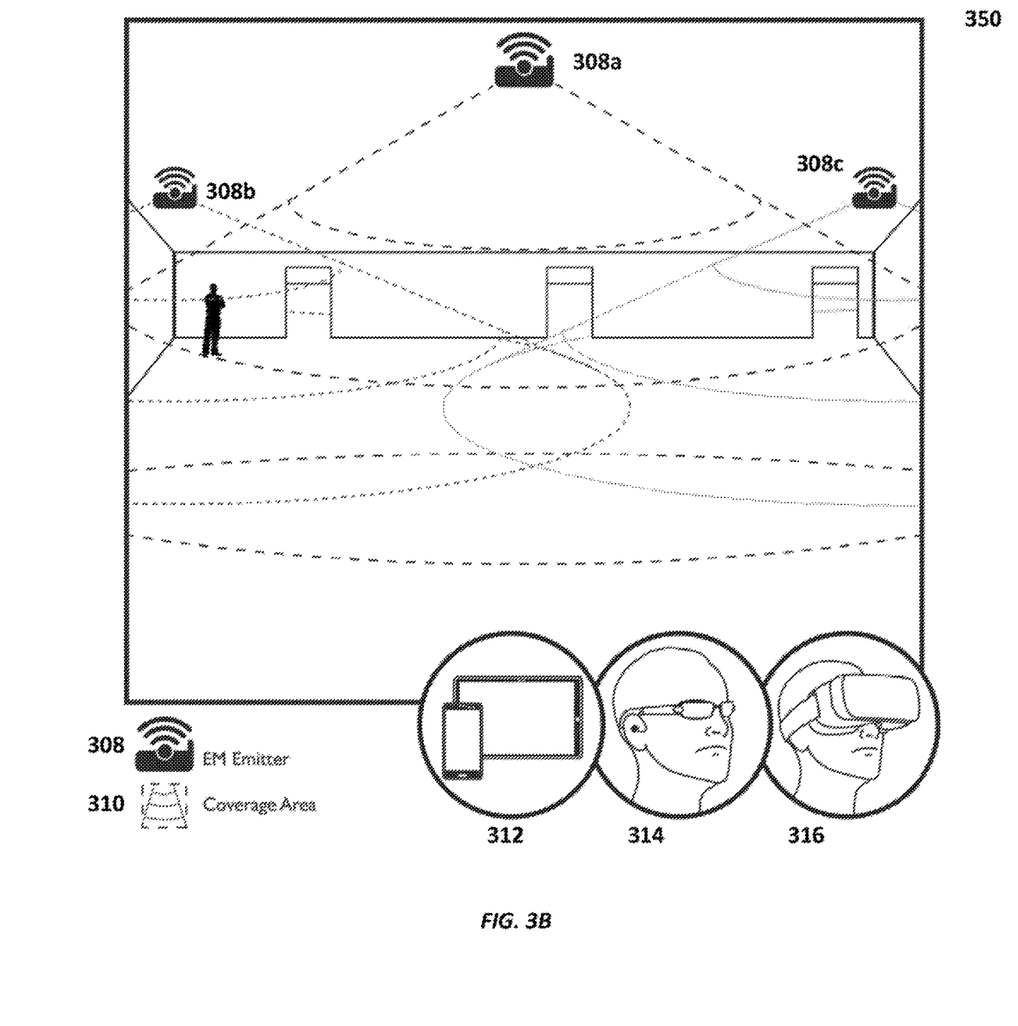
FIG. 3B is a conceptualized rendering of a first-person view of simulated EMR in an environment, in accordance with an implementation.

FIG. 3B is a conceptualized rendering of a first-person, ground level view 350 of simulated EMR in an environment, in accordance with an implementation. The ground-level view 350 illustrates three EM emitters 308a, 308b, and 308c. The potential capabilities of a given emitter selected by the end-user as related to this disclosure include, but are not limited to, capacity, range, power, and the nature of the emission by an EM emitter.

Figure 4A:
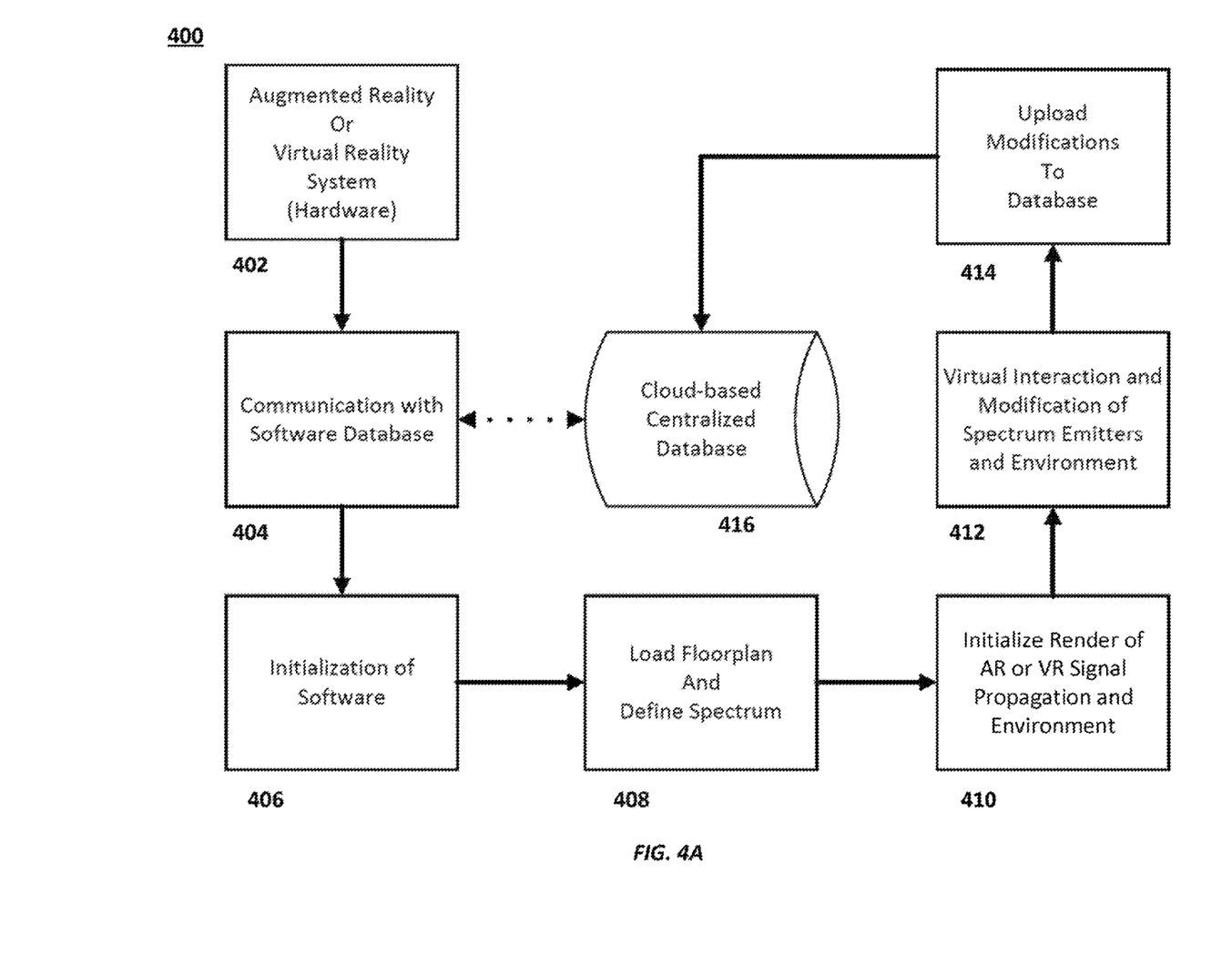
FIG. 4A is a diagram illustrating the hardware configuration process interacting with a centralized, web-based database for synchronization for sending and receiving data used to build the virtual or augmented EMR environment, in accordance with an implementation.

FIG. 4A is a diagram 400 illustrating the hardware configuration process interacting with a centralized, web-based database for synchronization for sending and receiving data used to build the virtual or augmented EMR environment, in accordance with an implementation. An end user can operate a user device, such as an AR or VR system that is configured to communicate over a wired or wireless communication system with one or more networked devices (402). Augmented Reality can include technology that superimposes a computer-generated image on a user's view of the real world, thus providing a composite view. Virtual Reality can include computer-generated simulation of a three-dimensional image or environment that can be interacted with in a seemingly real or physical way by a person using appropriate electronic equipment, such as a helmet with a screen inside or gloves fitted with sensors.

The user device can communicate with one or more storage systems, such as a cloud-based centralized database (404). In order for the end-user to interact with the floorplan and related elements in either an AR or VR environment, using either an AR or VR implement, the end-user may access the floorplan from within the AR or VR system software, either by referencing a locally-stored or cloud-based file, to then be viewed and rendered by either an AR or VR implement, to be further interactively displayed to and desirably manipulated by the end-user. The cloud-based system can include a repository of pertinent information, such as floorplans, system software, application software, updates, emitter information, etc.

EMR visualization software designed to run on any AR or VR implement can be loaded by the chosen AR or VR implement, and run accordingly (406). This software can be configured to allow the end-user the ability to navigate to saved floorplan data, load the desired floorplan, and then run, to facilitate desired functionality of the end-user, limited by the capabilities of the chosen AR or VR implement.

After the end-user has loaded the desired floorplan, the end-user must define which EM spectrum they wish to simulate. This data could also be encoded into the file, which they loaded previously, to save the end-user the step of choosing the spectrum each time a floorplan is loaded (408).

The end user can initialize the rendering of a virtual reality or augmented reality signal propagation and the environment (410). Once the desired floorplan has been loaded, it is initialized. The end-user can then be prompted to confirm that the desired floorplan has been initialized correctly. The end-user should then be prompted to render the plan, including but not limited to, signal propagation from the emitters, and any obstacles that were determined in the floorplan.

After rendering has completed, the end-user can see the floorplan as shown in FIG. 2, FIG. 3A and FIG. 3B. The end-user should now be able to manipulate the rendered elements virtually, limited by the capabilities of the chosen AR or VR implement (412). Manipulations include but are not limited to adding, modifying, or removing rendered elements.

Updates that are made by the end-user while using the EMR visualization software can be manually or automatically uploaded to a cloud-based database using real-time data synchronization (414).

A cloud-based centralized database can serve as a localized point for collaborative efforts, and can be accessed by multiple party members (416). This can serve as a consolidated store for all designs and can contain the actual files used, which the AR or VR implement chosen by the end-user might reference when attempting to perform the previous steps. A cloud-based centralized database may allow an end-user to maintain relevant and consistent project data across any capable hardware platform. This can maintain that the same plan and updates are consistent regardless of the chosen AR or VR implement by the end-user, limited by the capabilities of the chosen AR or VR implement.

Figure 4B:
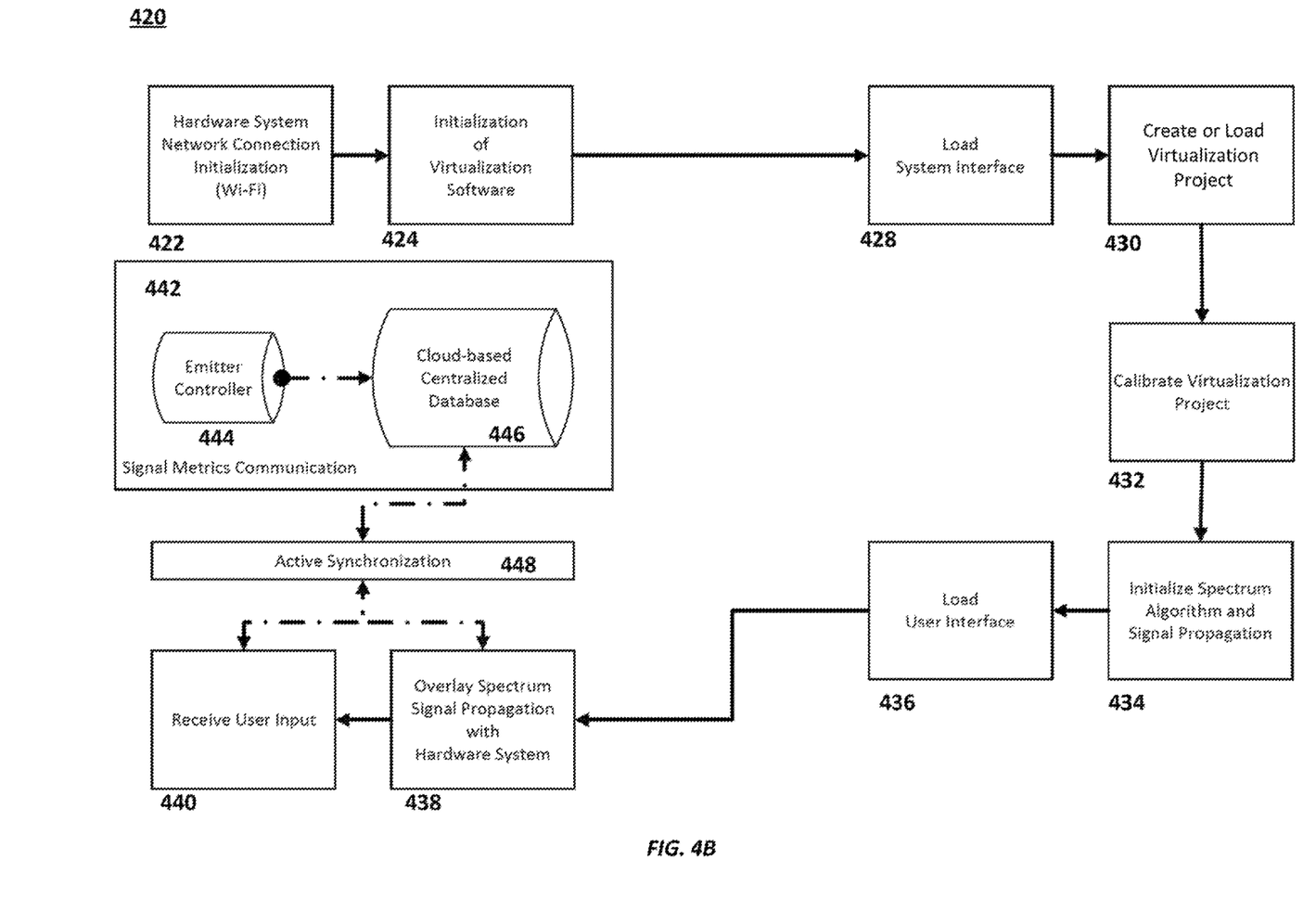
FIG. 4B is a diagram illustrating the software process interacting with a centralized, web-based database for synchronization for sending and receiving data used to build the virtual or augmented EMR environment, in accordance with an implementation.

FIG. 4B is a diagram 420 illustrating the software process interacting with a centralized, web-based database for synchronization of data used to build the virtual or augmented EMR environment, in accordance with an implementation. At the outset, a user device can be initialized, including network connection initialization (422). Using the chosen AR or VR implement by the end-user, Wi-Fi communication can be used to provide real-time data synchronization between the program used by the AR or VR implement with a cloud-based database. Software used to load floorplans may be initialized by the end-user using the chosen AR or VR implement interface (424). When the end-user loads the software on the chosen AR or VR implement, it can include, but not be limited to, project criteria necessary for a successful experience. The end-user can then load a system interface (428) and navigate the chosen AR or VR interface and either create a new project or load an existing one (430).

The end-user may now go through the process of calibrating the floorplan (432). The end-user may define where they are presently standing after loading the floorplan. The end-user may also define their height. Any used calibration requirements can be stated here.

The EM signal can be simulated and visualized (434). Before the signal can be generated, the AR or VR implement software may prompt the end-user to specify the parameters based on which the signal will be projected to either their AR or VR implement display. The software may then prompt the end-user to generate signal, once the specified and desired parameters are confirmed.

The chosen AR or VR implement software may load a navigable user interface for the end-user to achieve interaction with the projected environment, but is not limited to interacting with the environment that is to be projected onto the display of the chosen AR or VR implement.

The AR or VR implement should have enough information at this point from end-user input to generate a signal coverage map that will then be projected onto the display of the chosen AR or VR implement (436).

The end-user may, at this point, freely manipulate elements contained within the projection of the AR or VR implement (438). Changes made by the user can be manually or automatically synchronized with a cloud-based database (440).

A remote system 442 can include an emitter controller 444 and a cloud-based database 446. The remote system 442 can be accessed through a network connection. The system 442 can be a single system that includes both the emitter controller 444 and the database 446, or a distributed system, such as a cloud-based system, where the emitter controller 444 and the database 446 are distributed and communicate across a network. Signal metrics communication takes place between the cloud-based database (DB) (446) and an emitter controller (444). Information sent from the emitter controller to the cloud-based DB may then be available via the chosen AR or VR implement in use by the end-user. Data available could include, but is not limited to, emitter MAC address, serial number, power output, signal strength, signal spectrum, and active connections.

An emitter controller 444 can be either a hardware appliance or a virtual appliance, which controls emitter behavior and serves as a centralized location for configuration of the emitters. A cloud-based centralized database 446 can serve as a localized point for collaborative efforts, and can be accessed by multiple party members. This can serve as a consolidated store for all designs and may contain the actual files used, which the AR or VR implement chosen by the end-user will reference when attempting to perform the previous steps. A cloud-based centralized database allows an end-user to maintain relevant and consistent project data across any capable hardware platform. This can allow for consistent updates of the same plan, regardless of the chosen AR or VR implement by the end-user, limited by the capabilities of the chosen AR or VR implement.

Active synchronization can take place between the chosen AR or VR implement currently in use by the end-user and a cloud-based database (448). Updates that are made by the end-user during the time of use can be manually or automatically uploaded to a cloud-based database using real-time data synchronization.

Figure 4C:
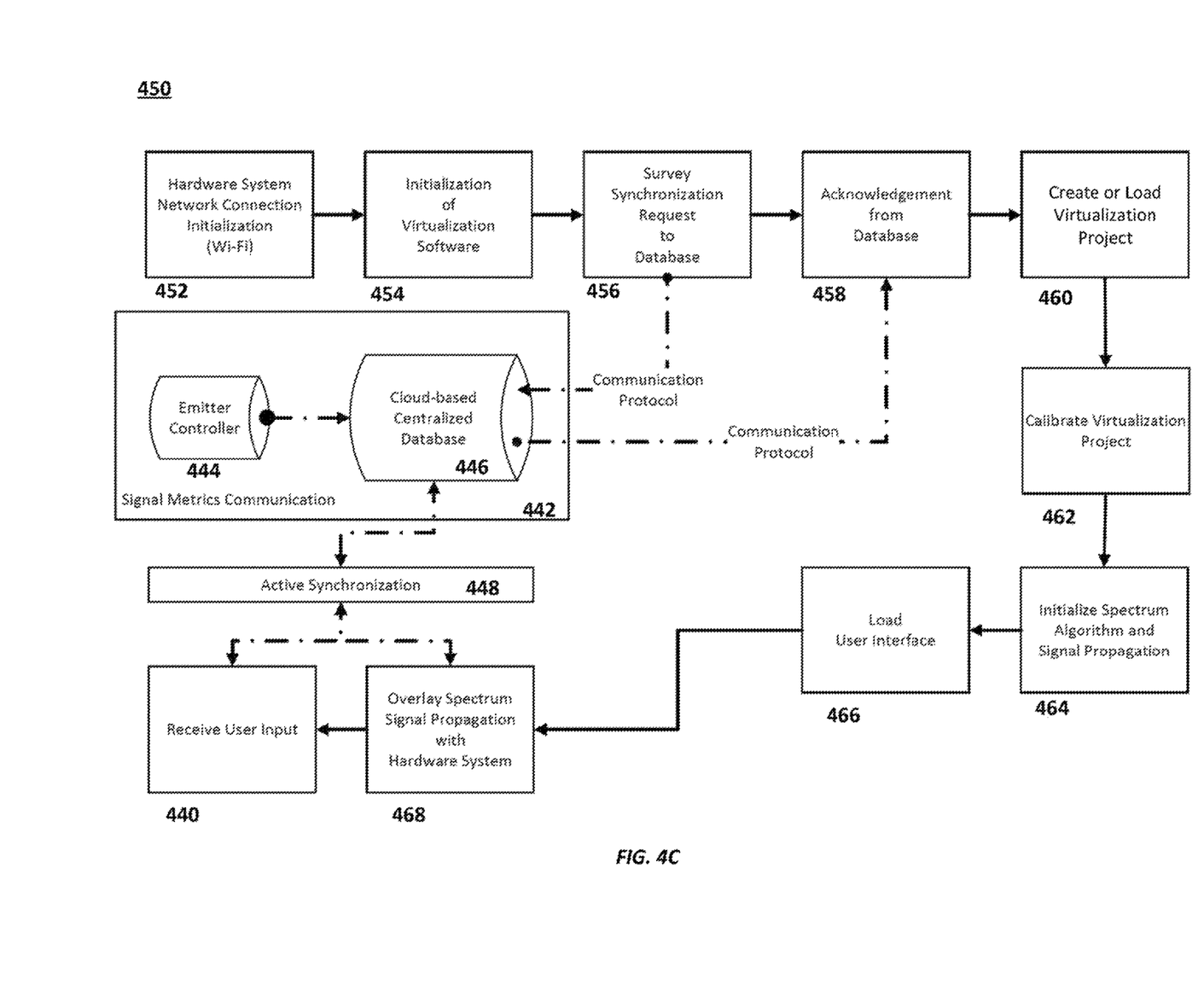
FIG. 4C is a diagram illustrating the stand-alone process of delaying initial interaction with a centralized, web-based database for synchronization for sending and receiving data used to build the virtual or augmented EMR environment, and synchronizing at a later time, in accordance with an implementation.

FIG. 4C is a diagram 450 illustrating a stand-alone process of delaying initial interaction with a centralized, web-based database for synchronization of data used to build the virtual or augmented EMR environment, and synchronizing at a later time, in accordance with an implementation. At the outset, a user device can be initialized, including network connection initialization (452). Using the chosen AR or VR implement by the end-user, Wi-Fi communication can be used to provide real-time data synchronization between the program used by the AR or VR implement and a cloud-based database. Software used to load floorplans can be initialized by the end-user using the chosen AR or VR implement interface (454). Data synchronizes between the installed software on the chosen AR or VR implement and the cloud-based database, to allow for data consistency. Common communication protocols that can be used including, but not limited to, TCP/IP port-based communication (456).

When the end-user loads the software on the chosen AR or VR implement, it may include, but not be limited to, project criteria necessary for a successful experience. The end-user can then load a system interface (458) and navigate the chosen AR or VR interface and either create a new project or load an existing one (460).

The end-user may now go through the process of calibrating the floorplan (462). The end-user can define where they are presently standing after loading the floorplan. The end-user may also define their height. Any used calibration requirements can be stated here.

The EM signal can be simulated and visualized (464). Before the signal can be generated, the AR or VR implement software may prompt the end-user to specify the parameters of the signal that can be projected on either their AR or VR implement display. The software may then prompt the end-user to generate signal, once the specified and desired parameters are confirmed.

The chosen AR or VR implement software may load a navigable user interface for the end-user to achieve interaction with the environment, but is not limited to interacting with the environment that is to be projected onto the display of the chosen AR or VR implement.

The AR or VR implement should have enough information at this point from end-user input to generate a signal coverage map that will then be projected onto the display of the chosen AR or VR implement (466).

The end-user may, at this point freely manipulate elements contained within the projection of the AR or VR implement (468). Changes made by the user are manually or automatically synchronized with a cloud-based database (440).

Signal metrics communication takes place between the cloud-based database (446) and an emitter controller (444). Information sent from the emitter controller to the cloud-based DB may then be available via the chosen AR or VR implement in use by the end-user. Data available could include, but is not limited to, emitter MAC address, serial number, power output, signal strength, signal spectrum, and active connections.

An emitter controller 444, which can either be a hardware appliance or a virtual appliance, controls emitter behavior and serves as a centralized location for configuration of the emitters. A cloud-based centralized database 446 can serve as a localized point for individual and/or collaborative efforts, and can be accessed by multiple party members. This may serve as a consolidated store for all designs and will contain the actual files updated, which the AR or VR implement chosen by the end-user will reference when attempting to perform the previous steps. A cloud-based centralized database can allow an end-user to maintain relevant and consistent project data across capable hardware platforms. This can allow for consistent updates of the same plan regardless of the chosen AR or VR implement by the end-user, limited by the capabilities of the chosen AR or VR implement.

Active synchronization can take place between the chosen AR or VR implement currently in use by the end-user and a cloud-based database (448). Updates that are made by the end-user during the time of use can be manually or automatically uploaded to a cloud-based database using real-time data synchronization.

Figure 4D:
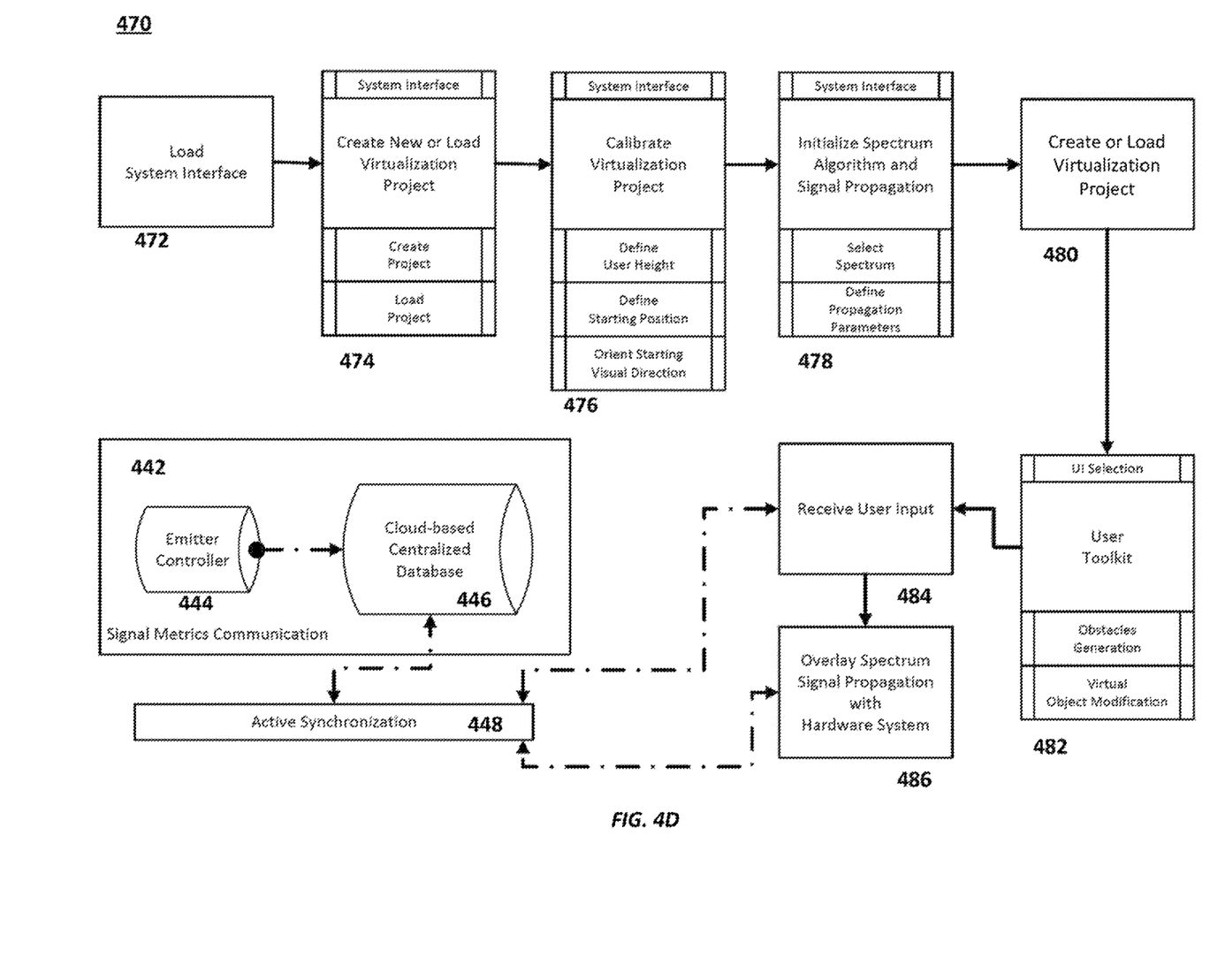
FIG. 4D is a diagram illustrating the user interaction process with a virtual or augmented reality environment, in accordance with an implementation.

FIG. 4D. is a diagram 470 illustrating the user interaction process with a virtual or augmented reality environment, in accordance with an implementation. When the end-user loads the software on the chosen AR or VR implement, it should include, but not be limited to, all used project criteria necessary for a successful experience (472). The system interface allows the end user to either load a project or create a new project (474). The end-user can define calibration parameters to achieve a successful experience while using the chosen AR or VR implement (476). The calibration parameters can include, but are not limited to, calibrating the height of the end-user, defining the starting location of the end-user as the end-user appears on the floorplan, and in what direction the end-user is currently facing during the time of the calibration.

After calibration of the chosen AR or VR implement, the end-user can, through the system interface, initialize the projection of the emitter signal onto the display of the chosen AR or VR implement (478). Initialization can include but is not limited to, the spectrum in which the emitters operate, and the parameters of the nature of the propagation of the emission from the emitters on the chosen spectrum.

The chosen AR or VR implement software can load a navigable user interface for the end-user to achieve interaction with the environment, but is not limited to interacting with the environment that is to be projected onto the display of the chosen AR or VR implement (480).

The end-user can, but is not limited to, add, modify, or move virtual elements and user interface selection (482), limited only by the capabilities of the chosen AR or VR implement. For example, the UI selection can include, but is not limited to, using hand gestures, wands, voice commands, or other possible means of manipulation. In general, a user toolkit is available to the end user to customize the user experience, enhance manipulation capabilities, add or take away virtual emitters, etc.

The software can allow for user input, which is then recorded to a local or cloud-based database (484). Tools available to the end-user include, but are not limited to, what is included in the User Toolkit The spectrum and environment can be overlaid onto the display of the hardware system (486). Any modifications made to the project by the end-user can be viewed in real-time and can be projected onto the display medium of the chosen AR or VR implement.

Figure 4E:
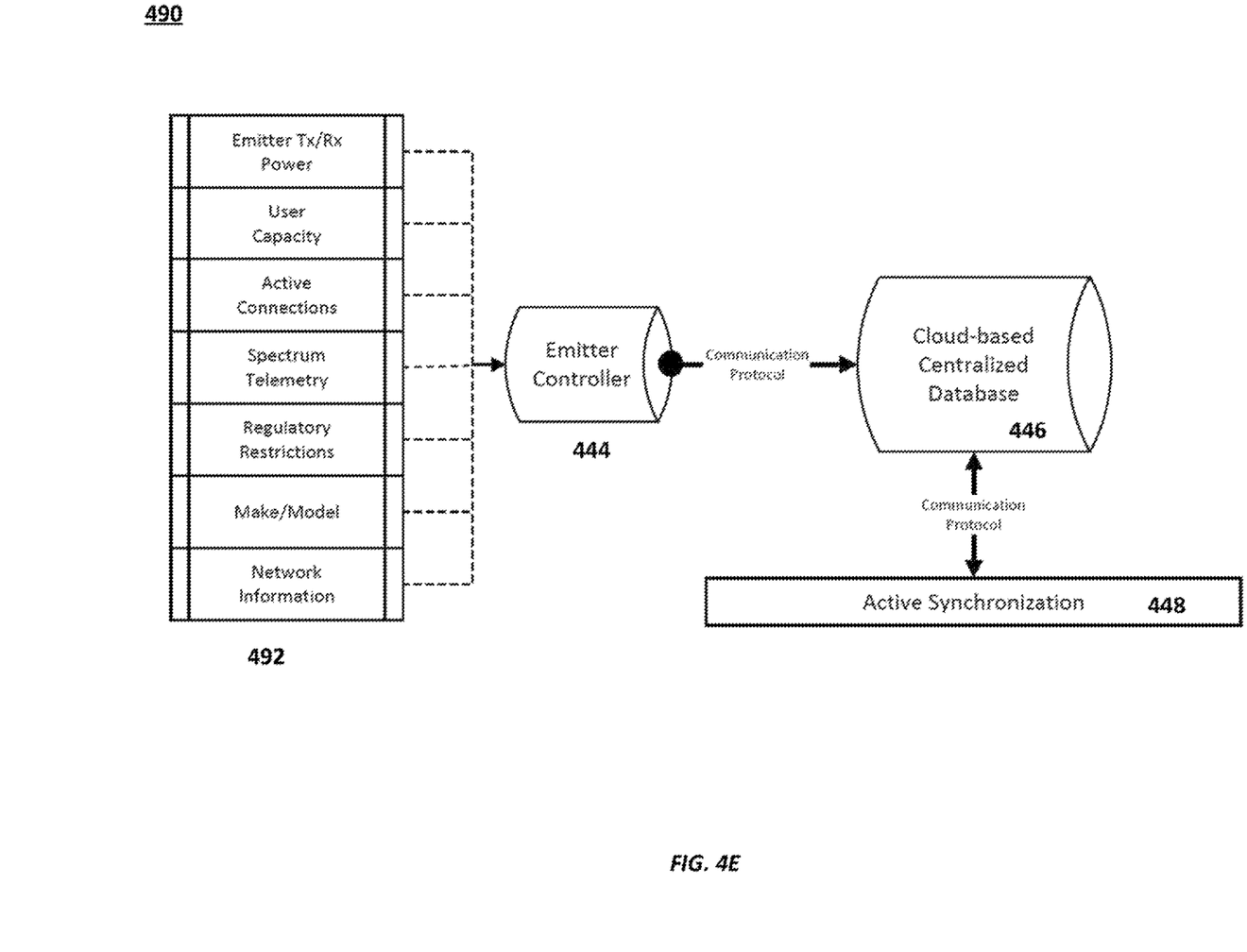
FIG. 4E is a diagram illustrating the emitter controller synchronization for modification of visual interpretation, in accordance with an implementation.

FIG. 4E is a diagram 490 illustrating the emitter controller synchronization for modification of visual interpretation, in accordance with an implementation. Available metric data 492 from the emitter controller 444 that can be used by the end-user during any part of the viewing includes, but is not limited to, emitter transmit and receive antenna power, emitter capacities, active associations to a given emitter, spectrum telemetry, organizational regulatory restrictions, the make and model of the emitter, and any pertinent network information related to a given emitter.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product comprising a non-transitory computer readable storage medium comprising computer readable program code embodied therewith, the computer readable program code comprising:
   computer readable program code configured to provide a three-dimensional visualization of a floorplan to a user device;
   computer readable program code configured to provide a visualization of one or more electromagnetic radiation emitters in the visualization of the floorplan to the user device;
   computer readable program code configured to simulate electromagnetic emission from the one or more electromagnetic radiation emitters;
   computer readable program code configured to display onto the displayed floorplan an augmented reality-based visualization of the simulated electromagnetic emissions from the electromagnetic radiation emitters on the user device;
   computer readable program code to:
      receive a hand-gesture input to move one of the electromagnetic radiation emitters from a first location in the floor plan to a different location in the floorplan;
      display the one of the electromagnetic radiation emitters in the different location;
      simulate electromagnetic emissions from the electromagnetic radiation emitters based on the moved electromagnetic radiation emitter; and
      display onto the displayed floorplan an augmented reality-based visualization of the simulated electromagnetic emissions from the electromagnetic radiation emitters based on the moved electromagnetic radiation emitter.

2. The computer program product of claim 1, further comprising:
   computer readable program code configured to display the one or more electromagnetic radiation emitters on the display device;
   computer readable program code configured to simulate a user interaction with the displayed one or more electromagnetic radiation emitters; and
   computer readable program code configured to display a change in the electromagnetic emissions from the one or more electromagnetic radiation emitters based on the simulated user interaction.

3. The computer program product of claim 1, further comprising:
   computer readable program code configured to retrieve the floorplan from a database over a network location and store a modified version of the floorplan that includes location or simulation information for the one or more electromagnetic radiation emitters.

4. The computer program product of claim 1, further comprising:
   computer readable program code configured to display a user interface on the display device;
   computer readable program code configured to accept input through the user interface, the input comprising one or both of parameters for the one or more electromagnetic radiation emitters or the floorplan, wherein the simulated electromagnetic emissions are based on the parameters.

5. The computer program product of claim 4, wherein parameters for the one or more electromagnetic radiation emitters comprise one or more of emitter transmission and/or reception power, user capacity, number of active connections, spectrum telemetry, regulatory restrictions, manufacturer and/or model number, or network information.

6. The computer program product of claim 4, wherein the input comprises one or more of information about a user of the display device, the information comprising physical information, location information, or physical orientation.

7. The computer program product of claim 1, further comprising:
computer readable program code configured to provide a user an interactive tool kit, the interactive tool kit comprising one or more virtual tools for interacting with the displayed floorplan and/or displayed electromagnetic emissions.

8. The computer program product of claim 7, wherein the tool kit comprises one or both of physical obstacles or electromagnetic radiation emitters.

9. The computer program product of claim 8, wherein the tool kit comprises a plurality of physical obstacles, each physical obstacle characterized based on physical shape, material composition, thickness, volume, or electromagnetic interaction information.

10. A computer implemented method comprising:
displaying a three-dimensional floorplan onto a user device;
simulating electromagnetic radiation from an electromagnetic radiation emitter;
displaying an augmented reality-based visualization of the simulated electromagnetic radiation onto the floorplan;
displaying an electromagnetic emitter on the user device;
receiving a hand-gesture user input to move the electromagnetic emitter;
displaying the electromagnetic emitter in a new location on the floorplan; and
altering the display of the augmented reality-based visualization of simulated electromagnetic radiation on the display device based on the new location of the electromagnetic emitter.

11. The method of claim 10, further comprising downloading the three-dimensional floorplan from a network repository and uploading a version of the floorplan comprising location or simulation information for the one or more electromagnetic radiation emitters.

12. The method of claim 10, further comprising:
providing a virtual toolkit;
displaying the virtual toolkit onto the display device;
receiving an input to use a tool from the toolkit;
providing a tactile interaction of the tool; and
displaying the interaction on the display device.

13. The method of claim 10, further comprising:
providing a user interface displayed onto the display device; and
receiving through the user interface, a configuration input, the configuration input comprising physical locations of one or more electromagnetic radiation emitters; physical obstacles in the floorplan; physical features of a user; unknown dimensions of the floorplan; or operational information of the one or more electromagnetic radiation emitters.

14. A user device comprising:
a processor;
a memory;
a network transceiver; and
a display device;
the system configured to:
provide a visualization of a floorplan to a display device;
display one or more electromagnetic radiation emitters on the display device;
simulate electromagnetic emissions from the one or more electromagnetic radiation emitters; and
display onto the displayed floorplan an augmented reality-based visualization of the simulation of electromagnetic emissions from the electromagnetic wave emitters on the display device;
simulate a user interaction with the displayed one or more electromagnetic radiation emitters, the user interaction comprising a hand gesture; and
display on the display device a change in the augmented reality-based visualization of the simulated electromagnetic emissions from the one or more electromagnetic radiation emitters based on the simulated user interaction.

15. The user device of claim 14, further configured to retrieve the floorplan from a network location.

16. The user device of claim 14, further configured to:
display a user interface on the display device; and
accept input through the user interface, the input comprising one or both of parameters for the one or more electromagnetic radiation emitters or the floorplan, wherein the simulated electromagnetic emissions are based on the parameters.

17. The user device of claim 16, wherein parameters for the one or more electromagnetic radiation emitters comprises one or more of emitter transmission and/or reception power, user capacity, number of active connections, spectrum telemetry, regulatory restrictions, manufacturer and/or model number, or network information.

* * * * *